(12) United States Patent
Mutter et al.

(10) Patent No.: US 10,929,334 B2
(45) Date of Patent: Feb. 23, 2021

(54) SUBSCRIBER STATION FOR A SERIAL BUS SYSTEM AND METHOD FOR DATA TRANSMISSION IN A SERIAL BUS SYSTEM

(71) Applicant: Robert Bosch GmbH, Stuttgart (DE)

(72) Inventors: Arthur Mutter, Neuhausen (DE); Simon Weissenmayer, Flein (DE); Steffen Walker, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 16/297,146

(22) Filed: Mar. 8, 2019

(65) Prior Publication Data
US 2019/0278738 A1 Sep. 12, 2019

(30) Foreign Application Priority Data

Mar. 12, 2018 (DE) ...................... 10 2018 203 680.2

(51) Int. Cl.
*G06F 13/42* (2006.01)
*G06F 13/40* (2006.01)

(52) U.S. Cl.
CPC ........ *G06F 13/4295* (2013.01); *G06F 13/405* (2013.01); *G06F 13/4081* (2013.01); *G06F 13/4217* (2013.01)

(58) Field of Classification Search
CPC ............... G06F 13/4295; G06F 13/405; G06F 13/4081; G06F 13/4217
USPC ........................................................ 710/106
See application file for complete search history.

(56) References Cited

U.S. PATENT DOCUMENTS

| | | | | |
|---|---|---|---|---|
| 5,036,869 A | * | 8/1991 | Inahara ................ | A61B 5/0006 600/481 |
| 5,402,394 A | * | 3/1995 | Turski ....................... | G06F 1/14 368/10 |
| 5,726,638 A | * | 3/1998 | Kobayashi ................ | H04L 1/24 180/287 |
| 10,649,946 B1 | * | 5/2020 | Brett ................... | G06F 13/4221 |
| 2003/0070019 A1 | * | 4/2003 | Dalakuras ......... | H04L 12/40156 710/110 |

(Continued)

OTHER PUBLICATIONS

Mipi alliance MIPI Alliance Specification for D-PHY Version 1.1 Nov. 7, 2011 (Year: 2011).*

(Continued)

*Primary Examiner* — Paul R. Myers
(74) *Attorney, Agent, or Firm* — Norton Rose Fulbright US LLP; Gerard Messina

(57) ABSTRACT

A subscriber station for a serial bus system are provided. The subscriber station includes a message creating device for creating a message to be transmitted serially via a bus of the bus system for at least one further subscriber station of the bus system, so that the message has a first time segment and a second time segment, and a transceiver device for serially sending the message to the bus in such a way that data in the first time segment are sent with a slower data rate than in the second time segment, the transceiver device having in the second time segment at least at times an exclusive, collision-free access to the bus, the message creating device to insert an identification number into the first time segment and to begin the second time segment at the latest after the final bit of the identification number and an additional bit.

14 Claims, 4 Drawing Sheets

(56) References Cited

U.S. PATENT DOCUMENTS

| | | | |
|---|---|---|---|
| 2010/0220735 A1* | 9/2010 | Vermunt | H04L 49/9063 370/401 |
| 2010/0232304 A1* | 9/2010 | den Besten | G06F 13/4072 370/252 |
| 2010/0329230 A1* | 12/2010 | Yang | H04W 48/12 370/345 |
| 2014/0328357 A1* | 11/2014 | Fredriksson | H04J 3/0614 370/520 |
| 2014/0365693 A1* | 12/2014 | Monroe | H04L 12/40032 710/105 |
| 2015/0264132 A1* | 9/2015 | Dang | H04W 76/10 709/206 |
| 2016/0043947 A1* | 2/2016 | Nickel | H04L 69/22 370/392 |
| 2017/0093908 A1* | 3/2017 | Elend | H04L 12/40045 |
| 2017/0118039 A1* | 4/2017 | Wiley | H04L 12/40136 |
| 2019/0268103 A1* | 8/2019 | Park | H04L 5/0055 |
| 2019/0346876 A1* | 11/2019 | Chen | G06F 1/10 |

OTHER PUBLICATIONS

CAN Specification Version 2.0 (Year: 1991).*
CAN with Flexible Data-Rate Specification Version 1.0 Apr. 17, 2012 (Year: 2012).*
"Road Vehicles-Controller Area Network (CAN)", International Standard, ISO+11898-1-2015, Dec. 2015, pp. 1-74.

* cited by examiner

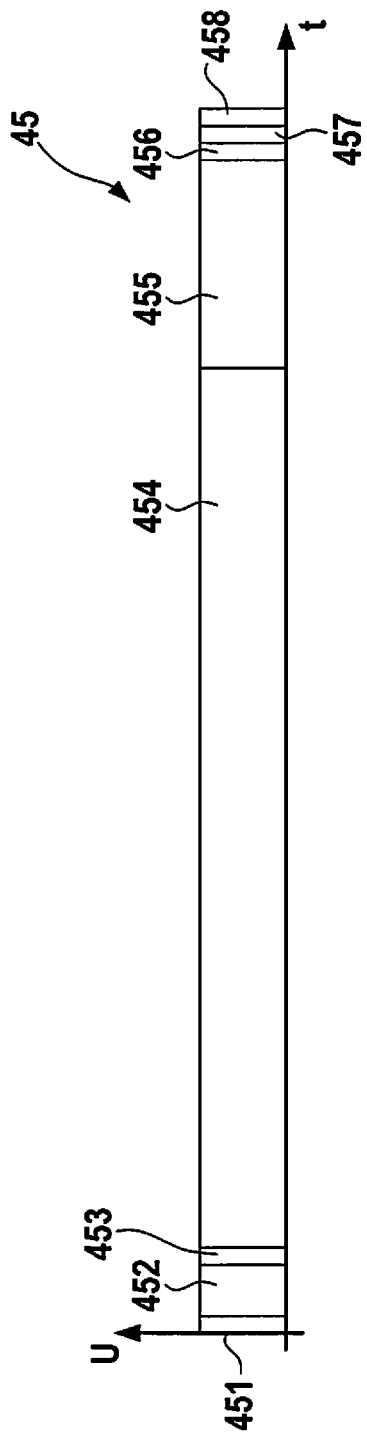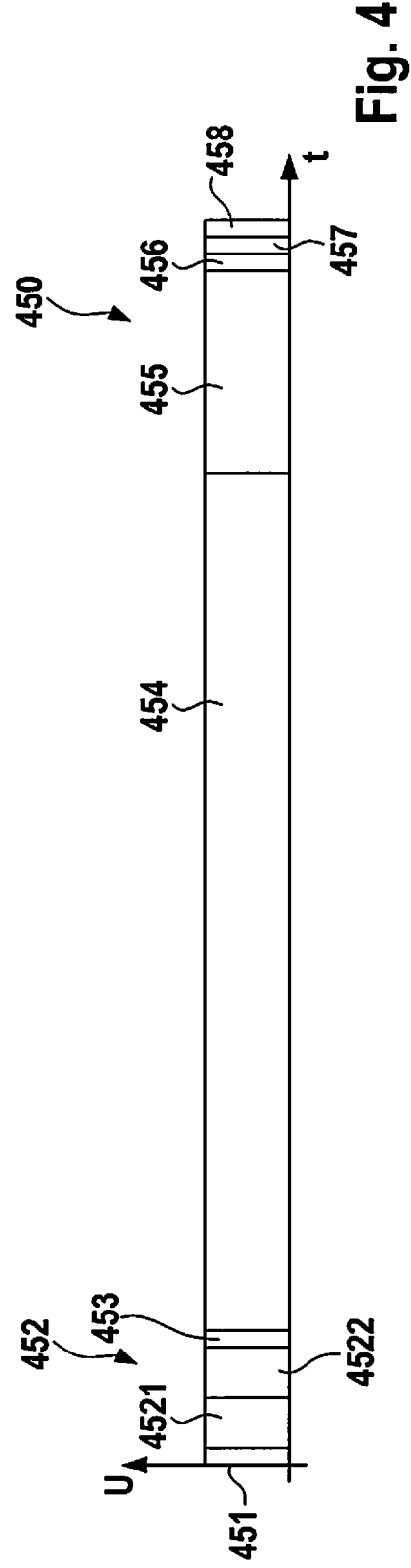

SUBSCRIBER STATION FOR A SERIAL BUS SYSTEM AND METHOD FOR DATA TRANSMISSION IN A SERIAL BUS SYSTEM

CROSS REFERENCE

The present application claims the benefit under 35 U.S.C. § 119 of German Patent Application No. DE 102018203680.2 filed on Mar. 12, 2018, which is expressly incorporated herein by reference in its entirety.

FIELD

The present invention relates to a subscriber station for a serial bus system and to a method for data transmission in a serial bus system in which only up to 15 subscribers can be addressed.

BACKGROUND INFORMATION

CAN networks are provided for example in vehicles for communication between control devices. In CAN networks, messages are transmitted using the CAN and/or CAN FD protocol, as described in the current ISO 11898-1:2015 as CAN protocol specification with CAN FD.

The success of CAN or CAN FD is due not least to the presence of an arbitration phase. In this phase, on the basis of identification numbers or identifiers negotiation takes place between the subscriber stations as to which of the subscriber stations will be temporally the next to have collision-free access to the bus of the bus system in order to send a message via the bus for at least one of the other subscriber stations of the bus system. In this way, the useful data of the messages can be transmitted in collision-free fashion.

However, it is problematic that during arbitration the bits of a message have to be applied to the bus until the level of the bits has been propagated over the entire bus. As a result, the speed of transmission of the bits, also called the transmissible data rate, is greatly limited during arbitration. This problem is exacerbated because in part messages having expanded identification numbers are sent, which prolongs the arbitration phase and thus the time of slow communication to the bus. The historical background here is that before the introduction of CAN FD, the content of the messages could be transmitted only with the same data rate as the identification numbers.

Moreover, it is standard that a subscriber station can use different identification numbers to enable sending messages with different degrees of priority. Here, the subscriber station that sends the message with the lowest identification number wins in the arbitration, and as a result is then permitted to send the message content or the useful data. In this way it is possible, given reduced available bandwidth at the bus, for important messages to be preferred over unimportant messages. However, the subscriber stations here require a certain number of usable identification numbers.

Increasing communication on the CAN bus requires an increase of the data rate even beyond that of CAN FD.

SUMMARY

It is an object of the present invention to provide a subscriber station for a bus system and a method for data transmission in a bus system that solve the problems named above. In particular, a subscriber station for a bus system and a method for data transmission and a bus system are to be provided in which the data rate at the bus can be further increased compared to previous solutions.

The object may be achieved by an example subscriber station for a serial bus system in accordance with the present invention. The subscriber station includes a message creating device for creating a message to be transmitted serially via a bus of the bus system for at least one further subscriber station of the bus system, so that the message has a first time segment and a second time segment, and a transceiver device for the serial transmission of the message to the bus in such a way that in the first time segment data are sent at a slower data rate than in the second time segment, the transceiver device having, in the second time segment, at least at times an exclusive, collision-free access to the bus, the message creating device being designed to insert an identification number into the first time segment and to begin the second time segment at the latest after the final bit of the identification number and an additional bit.

With the subscriber station, the data transmission rate or data rate can be increased by a multiple compared to conventional CAN or CAN FD.

With the communication carried out by the subscriber station, the previously large overhead of approximately 30% to 39%, which arises in conventional CAN or CAN FD due to the arbitration and additional control bits used, can be significantly reduced, to approximately 12% to 14%. As a result, the data rate increases by approximately 19% to 29%.

The method carried out by the subscriber station can be used in particular in small bus systems in which in particular up to 15 subscriber stations are connected to the bus system.

Moreover, stuff bits can be omitted that are inserted according to a bit stuffing method such that, according to the current ISO 11 898-1:2015, a recessive bit is inserted after each five successive dominant bits. Of course, a different number of bits can be selected after which the recessive bit is inserted. Through the omission of the stuff bits alone, the data rate can be increased by 56%.

Therefore, using both measures, the data rate can be doubled compared to the previous method.

The subscriber station described above can in addition be designed such that it changes to the standard protocol as needed, and can then also exchange information with standard CAN subscriber stations.

The method carried out by the described subscriber station is thus also usable by, or compatible with, previous CAN bus systems. Standard CAN or standard CAN FD subscriber stations can therefore gradually be replaced in the bus by a subscriber station as described above if not more than, in particular, 15 subscriber stations are to be addressed, or not more than 15 priorities for messages are to be distinguished.

Advantageous further embodiments of the subscriber station are described herein.

According to an embodiment, the message creating device is designed to insert into the beginning of the first time segment or before the first time segment an identification number having the value 0, and without the insertion of stuff bits, the transceiver device being designed to send the identification number having the value 0 to the bus with the slower data rate, and to continue the sending of the message if the transceiver device has received from the bus an error message from at least one further subscriber station of the bus system in the first time segment or at the beginning of the second time segment.

It is possible for the first time segment to end at the position at which a stuff bit is expected by one of the subscriber stations, given a synchronization of the subscriber stations of the bus system, if one of the other subscriber stations transmits a message having an identification number having the value 0. In addition or alternatively, the transceiver device is designed to send and receive the first four bits of the identification number with a slower data rate than the following bits of the message. Here, the message creating device can be designed to provide, directly following the bits of the identification number, first a reserved bit and then a data phase for the useful data to be transmitted. Here, the reserved bit is the first bit of the second time segment.

It is possible for the message creating device to be designed to terminate the message with an acknowledge field terminating bit.

According to an exemplary embodiment, the transceiver device can be designed to choose, after the reception of an error message from at least one additional subscriber station of the bus system in the first time segment or at the beginning of the second time segment, whether the sending of the message is to be continued or whether instead a message is to be created that is in accordance with the CAN protocol.

It is possible for the subscriber station to additionally have an error counter that is designed to count how often a transmit attempt is aborted, the subscriber station being designed to switch over to a transmit operating mode in which a message corresponding to the CAN protocol is sent when a counter state of the error counter exceeds a specified value.

According to an exemplary embodiment, the transceiver device can be designed to insert no stuff bits into the first time segment and/or into the second time segment of the message at the points at which the stuff bits would be expected given a synchronization of the subscriber stations of the bus system.

Moreover, it is possible that the subscriber station has, in the second time segment, an exclusive, collision-free access to the bus at least for the sending of the useful data of the message.

It is possible for the first time segment to be a time segment in which it is determined which subscriber station is given, at least at times, an exclusive, collision-free access to the bus after the first time segment.

The subscriber station described above can be part of a bus system that also includes a bus via which at least two subscriber stations are connected to one another in such a way that they can communicate with one another. Here, the at least two subscriber stations can be designed to maintain no waiting time between messages that are transmitted one after the other via the bus.

In addition, the object described above may be achieved by an example method for data transmission, in a bus system as described above, in accordance with the present invention. The example method is carried out by a subscriber station of the bus system and has the steps: creating, using a message creating device, a message to be transmitted serially via a bus of the bus system for at least one further subscriber station of the bus system, so that the message has a first time segment and a second time segment, and sending, by a transceiver device, of the message to the bus serially in such a way that data in the first time segment are sent with a slower data rate than in the second time segment, the transceiver device having, in the second time segment, at least at times an exclusive, collision-free access to the bus, the message creating device being designed to insert an identification number into the first time segment and to begin the second time segment at the latest after the final bit of the identification number and an additional bit.

The example method offers the same advantages as those named above in relation to the example subscriber station.

Further possible implementations of the present invention include combinations not explicitly named of features or specific embodiments described above or in the following in relation to the exemplary embodiments. The person skilled in the art will also add individual aspects to the basic form of the present invention as improvements or supplementation.

BRIEF DESCRIPTION OF THE DRAWINGS

Below, the present invention is described in more detail with reference to the figures, and on the basis of exemplary embodiments.

FIG. 3 shows an illustration of a design of messages sent by a further subscriber station of the bus system according to the first exemplary embodiment.

FIG. 4 shows an illustration of a design of a message sent by a subscriber station of the bus system according to a second exemplary embodiment.

DETAILED DESCRIPTION OF EXAMPLE EMBODIMENTS

Figure 1:
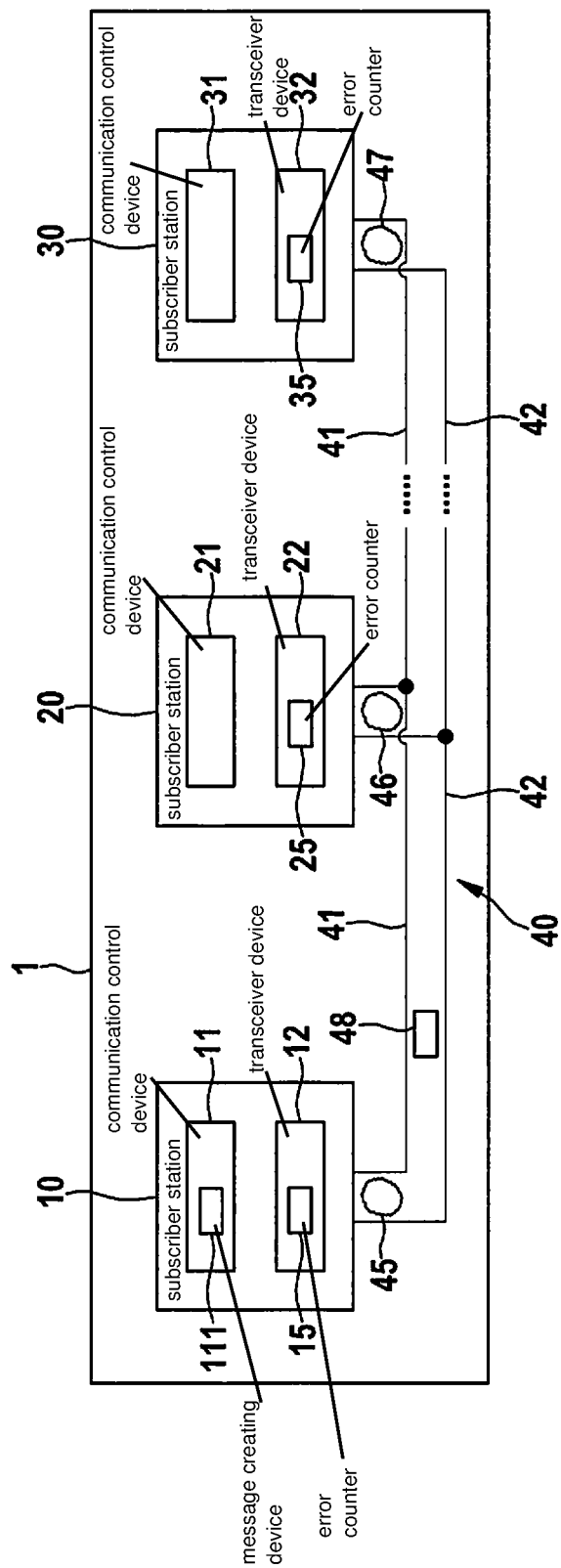
FIG. 1 shows a simplified schematic diagram of a bus system according to a first exemplary embodiment.

In the Figures, identical or functionally identical elements are provided with the same reference characters, unless otherwise indicated.

FIG. 1 shows a bus system 1 for the serial transmission of data. Bus system 1 is for example a CAN bus system, a CAN FD bus system, etc. Bus system 1 can be used in a vehicle, in particular a motor vehicle, an aircraft, etc., or in a hospital, etc. However, bus system 1 is not limited to a CAN bus system.

In FIG. 1, bus system 1 has a multiplicity of subscriber stations 10, 20, 30, each connected to a bus 40 by a first bus lead 41 and a second bus lead 42. Bus leads 41, 42 can also be designated CAN_H and CAN_L, and are used to couple in the dominant level in the transmit state. Via bus 40, messages 45, 46, 47 can be transmitted between the individual subscriber stations 10, 20, 30 in the form of signals. In this way, data that are to be transmitted from one of the subscriber stations 10, 20, 30 to at least one other of the subscriber stations 10, 20, 30 can be converted into signals at the bus. If one of the subscriber stations 10, 20, 30 recognizes an error in the communication at bus 40, then this subscriber station 10, 20, 30 sends an error message 48 to bus 40 that is received by the other subscriber stations 10, 20, 30.

Subscriber stations 10, 20, 30 are for example control devices or display devices or sensors of a motor vehicle or of an industrial facility or the like.

As shown in FIG. 1, subscriber station 10 has a communication control device 11 that has a message creating device 111 and a transceiver device 12 having an error counter 15. Subscriber station 20 has a communication control device 21 and a transceiver device 22 having an error counter 25.

Subscriber station 30 has a communication control device 31 and a transceiver device 32 having an error counter 35.

Transceiver devices 12, 22, 32 of subscriber stations 10, 20, 30 are each connected directly to bus 40, although this is not shown in FIG. 1.

Communication control devices 11, 21, 31, are each used to control a communication of the respective subscriber station 10, 20, 30 via bus 40 with another subscriber station of subscriber stations 10, 20, 30 connected to bus 40. Communication control devices 11, 21 may be realized as a conventional CAN controller or CAN FD controller. Communication control devices 11, 21 create a transmit signal TxD for a message 46 that is described in more detail below with reference to FIG. 2. At communication control device 11, message creating device 111 creates, from a transmit signal TxD for a message 46, a transmit signal TxD for a message 45. Communication control device 31 directly creates a transmit signal TxD for a message 47 that, like message 45, is constructed according to a modified CAN protocol, as described in more detail below with reference to FIG. 3.

Transceiver devices 12, 32 are used to send the respective messages 45, 47. Transceiver device 22 is used to send messages 46. Except for the differing functions described below for transceiver devices 12, 32, transceiver devices 12, 22, 32 can otherwise be realized as a conventional CAN transceiver or CAN FD transceiver.

Figure 2:
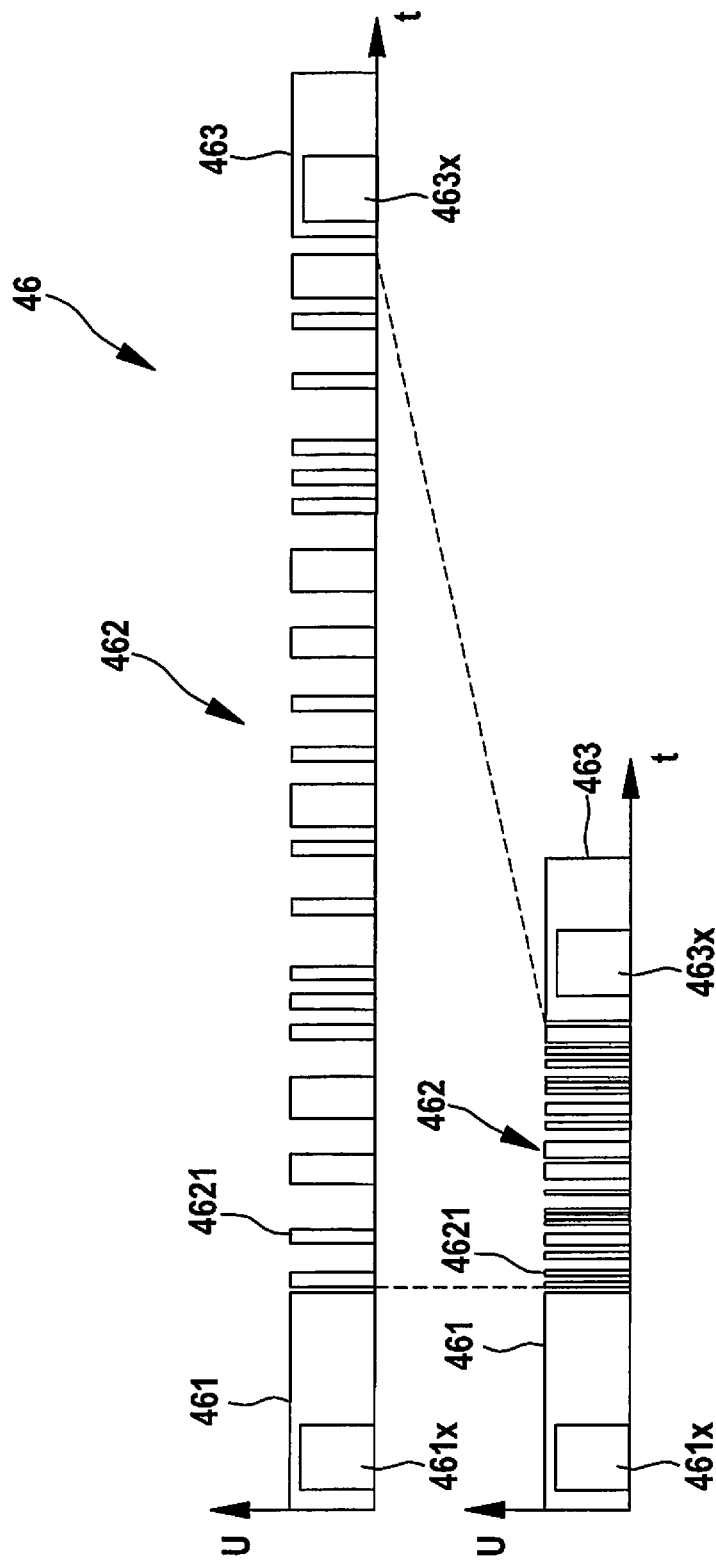
FIG. 2 shows an illustration of the design of a message sent by a subscriber station of the bus system according to the first exemplary embodiment.

FIG. 2 shows a message 46 that was created by subscriber station 20, or more precisely its communication control device 21, according to a protocol as described in the current ISO 11898-1:2015 as CAN protocol specification with CAN FD.

As is shown in FIG. 2 on the basis of message 46, at top for a CAN frame and at bottom for a CAN FD frame, in each case as voltage U over time t, the CAN communication at bus 40 can fundamentally be divided into two different time segments, namely the arbitration phases 461, 463, shown only schematically, and a data region 462 that, in the case of CAN-FD, can also be called the data phase and in which the useful data of message 46 are sent. In CAN-FD, in comparison to the classical CAN, at the end of the arbitration phase 461, 463 the data rate for the following data phase is increased to e.g. 2, 4, 8 Mbps. Here, in the case of CAN-FD the data rate in the arbitration phases 461, 463 can be smaller or faster than the data rate in data region 462. In CAN-FD, data region 462 is significantly shorter compared to data region 462 of the CAN frame.

In the arbitration phase 461, 463, with the aid of an identifying number 461x, 463x it is determined which of the currently transmitting subscriber station(s) 10, 20, 30 of bus system 1 will receive, in the subsequent data region 462, at least at times an exclusive, collision-free access to bus 40 of bus system 1. In data region 462, there takes place a transmission of the useful data of message 46 by the subscriber station that won the arbitration.

Communication control device 21 inserts stuff bits 4621 into the standard CAN message 46 at specified time intervals in order to enable a synchronization of subscriber stations 10, 20, 30 of bus system 1. According to the current ISO 11898-1:2015, a recessive bit, the stuff bit 4621, is inserted after each five successive dominant bits. Therefore, a sequence of six dominant bits one after the other is unambiguously recognized as an error identifier or error flag.

In contrast, FIG. 3 shows a message 45 that is constructed identically to a message 47. Thus, in the present exemplary embodiment, at least two of the subscriber stations 10, 20, 30 are designed to send or receive data in the form of messages or signals with the modified CAN protocol. Here, message creating device 111 and control device 31, as further message creating device, create transmit signals TxD for messages 45, 47.

Message 45 has a start bit 451 (start-of-frame) at its beginning, signaling the beginning of message 45. Start bit 451 (start-of-frame) is normally sent as dominant bit and thus dominant bus state. There subsequently follow 4 bits for an identification number 452, followed by one control bit 453, also called reserved bit. Control bit 453 is sent as dominant bit and thus dominant bus state, but is also accepted as recessive bus state by transceiver devices 12, 13 in the receive signal from bus 40, without sending an error message 48. There then follows a data phase 454 in which the useful data of message 45 are sent. The length of data phase 454, or of the useful data, can for example be 64 bytes, as in CAN FD. However, a different length of data phase 454, or different number of bytes for data phase 454, can also alternatively be selected. In particular, data phase 454 can be longer than 64 bytes, so that messages 45, 46, 47 all have the same length. Directly after data phase 454 there follows a checksum field 455 that enables a recognition of data errors in data phase 454. The checksum of checksum field 455 can be provided as a CRC (Cyclic Redundancy Check) checksum. Following checksum field 455, a checksum terminating bit 456 is sent as a recessive bit. Following this, an acknowledge field 457 is provided having the length of one bit, in which a receiver of message 45 sends an acknowledgement in the form of a dominant bus state when it has correctly received message 45. Following acknowledge field 458, an acknowledge field terminating bit 456 is sent as a recessive bit.

Subsequently, the frame of message 45 is terminated. The next message 45, or a message 47, can be sent directly subsequently thereto, i.e., without a waiting time or enforced pause between the two messages 45 or between messages 45, 47.

In message 45, all bits or data after the final bit of identification number 452 are sent with a faster data rate or data transmission speed than start bit 451 (start-of-frame) and identification number 452. Thus, start bit 451 (start-of-frame) and identification number 452 represent a first time segment of message 45. Control bit 453, or reserved bit, and at least data phase 454 are however transmitted with the faster data rate or data transmission speed. In addition, it is possible also to transmit checksum 455, checksum terminating bit 456, acknowledge field 457, and acknowledge field terminating bit 458 with the faster data rate or data transmission speed. Therefore, at least control bit 453, or reserved bit, and data phase 454 form the second time segment of message 45.

In the first time segment of message 45, it is negotiated between subscriber stations 10, 20, 30 which of the subscriber stations 10, 20, 30 will have in the second time segment at least at times an exclusive, collision-free access to bus 40. First time segment of message 45 thus corresponds to arbitration phases 461, 463 of message 46 of FIG. 2.

Because subscriber stations 10, 30 can use only one identification number 452, which is 4 bits long overall, subscriber stations 10, 30 can distinguish only 15 different subscriber stations or messages having different priority. Differing from this, with subscriber station 20, with identification numbers 461x, 463x, which have a length of 11 bits overall, a much larger number of subscriber stations 10, 30 can be distinguished and can thus be connected to bus 40.

Thus, in messages 45, 47 the first time segment ends at the point at which, given a synchronization of subscriber stations 10, 20, 30 of bus system 1, a stuff bit 4621 is expected by subscriber station 20 when one of the subscriber stations 10, 30 transmits a message having an identification number 4521 having the value 0.

In bus system 1, second subscriber station 20 is quickly withdrawn from (active) communication for two reasons when one of the subscriber stations 10, 30 sends one of the messages 45, 47. Either subscriber stations 10, 30 send a message 46 having ID 0 and not having stuff bit 4621, which is recognized by subscriber station 20 as an infringement of protocol, or subscriber station 20 will recognize an error shortly before the beginning of data phase 454 of message 45, and will therefore send an error message 48 to bus 40. Subscriber stations 10, 30 will not increment their error counter 15, 35 upward for an error message 48 based on a transmitted ID 0 not having a stuff bit. Thus, the counter state of error counter 15, 35 remains unchanged for the named case. In addition or alternatively, a separate error counter can be provided for the named errors, so that these errors are also counted.

If the transmitting subscriber station of subscriber stations 10, 30 receives a further error message 48 in the course of sending the data of data phase 454, then the transmitting subscriber station increments its error counter 15, 35 upward. Moreover, the associated transceiver device 12, 32 can choose whether the sending of message 45, 47 is to be continued or repeated, or instead a return is to be made to the CAN protocol. The decision regarding this can be made based on whether the counter state of error counter 15, 35 exceeds a specified value.

If the return to the CAN protocol is to be made, communication control device 11, or the message creating device, instead creates a message 46 for the next communication cycle.

When bus system 1 is started up, all subscriber stations 10, 20, 30 become activated one after the other and in part also begin to send messages 45, 46, 47. Because the long compulsory pause present between messages 46 no longer exists after each message 45, 47, it can happen that so many messages 45, 47 are sent one after the other that newly added subscriber stations 10, 20, 30 can no longer find the beginning and end of messages 45, 46, 47, because this is easily possible only if there is a longer pause between two messages 45, 46, 47. Therefore, in such a case the subscriber stations 10, 20, 30 wait for some time. If no pause arises during this time, they then send an error message 48 enabling all subscriber stations 10, 20, 30 that have become active up to then to enter into the communication.

In this way, compared to the previous sending of messages 46 the communication in bus system 1 can be accelerated. Message 45, 47 has, compared to a message 46, a significantly lower surplus of control data that have to be present in message 45 in addition to the useful data in order to ensure correct data transmission at bus 40. That is, messages 45, 47 do not include the one-bit remote transmission request, the one-bit identifier extension, the 4-bit data length code, the 7-bit end-of-frame, and the 3-bit intermission that are present in a message 46.

In addition or alternatively, at least one of the subscriber stations 10, 30 can send an identification number 0 without the insertion of stuff bits 4621. As a result, at the beginning of message 45 six dominant bits are transmitted in sequence. As mentioned above, subscriber station 20 will evaluate message 45 as errored, and will therefore send an error message 48 to bus 40. As a result, subscriber station 20 will withdraw from active communication for the duration of a message 46.

For this purpose, in the initialization of bus system 1, identification number 0 is not assigned to any specific subscriber station 10, 20, 30 of bus system 1. Therefore, identification number 0 can be used by all subscriber stations 10, 20, 30 when subscriber stations 10, 20, 30 first become active at bus 40. The omission of stuff bit 4621 by subscriber stations 10, 30 infringes the standard CAN protocol, and as a result subscriber station 20, as a classical CAN subscriber, reacts with an error message 48. Subscriber stations 10, 30 can either again send identification number 0 until subscriber station 20 leaves the active communication, or can change over to the classical protocol according to FIG. 2 in favor of subscriber station 20, as mentioned above.

FIG. 4 shows a message 450 according to a second exemplary embodiment that can be created and sent in the bus system 1 of FIG. 1 instead of a message 45 or a message 47.

Accordingly, message creating device 111 and/or communication control device 31 are designed to insert an identification number 4521 having the value 0 into the beginning of the first time segment for the identification number 452. Only after this is the actual identification number 4522 for message 450 put in place, which number indicates the priority of message 450. In other respects, message 450 is constructed in the same way as a message 45 or a message 47 according to the first exemplary embodiment.

Based on identification number 4521 having the value 0 at the beginning of message 450 and the omission of stuff bit 4621, six dominant bits are transmitted in sequence at the beginning of message 45. As mentioned above, subscriber station 20 will thus evaluate message 450 as errored, and will therefore send an error message 48 to bus 40. As a result, subscriber station 20 will withdraw from active communication for the duration of a message 46.

According to a modification of message 450, at least one of the subscriber stations 10, 30 sends an identification number having the value 0, without the insertion of stuff bits 4621, before the beginning of the transmission of a message 45, 47, until subscriber station 20 withdraws from the communication as described above. Only then is message 45, 47 sent.

In this way as well, the communication in bus system 1 can be accelerated compared to a message 46.

Figure 5:
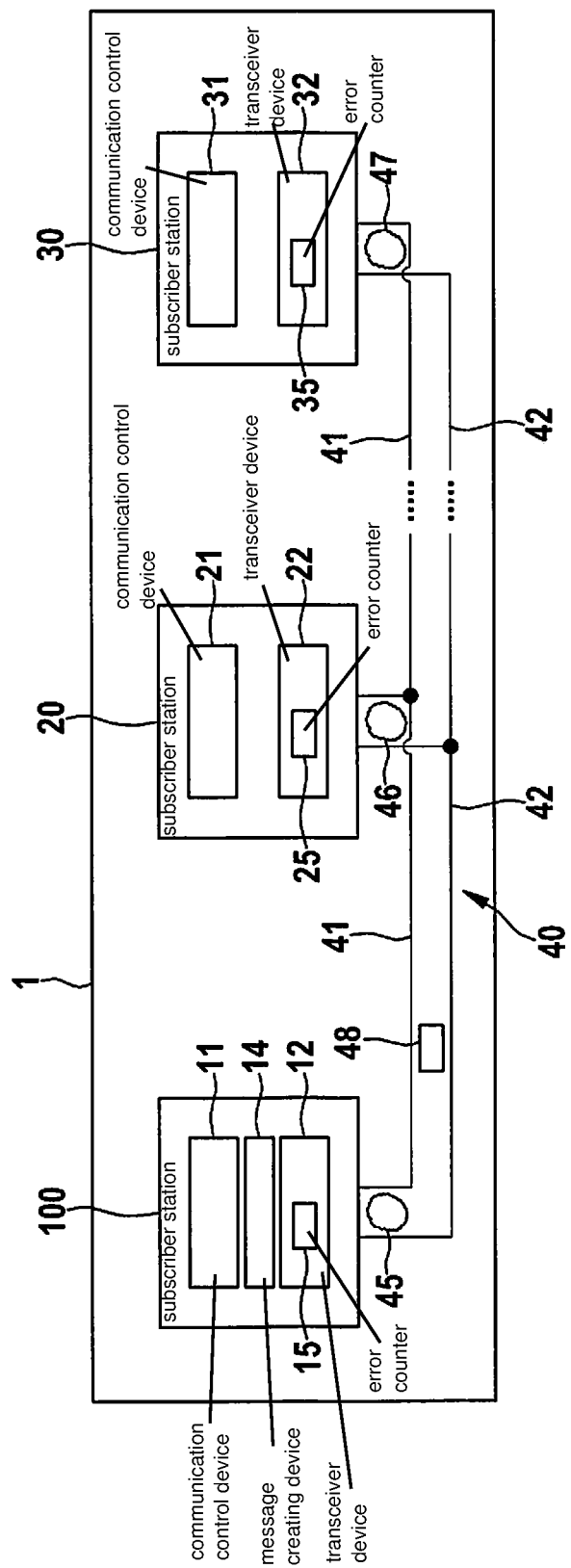
FIG. 5 shows a simplified schematic diagram of a bus system according to a third exemplary embodiment.

FIG. 5 shows a bus system 2 according to a third exemplary embodiment. Differing from bus system 1 of the preceding exemplary embodiments, a subscriber station 100 is provided that has a separate message creating device 14 in addition to communication control device 11 and transceiver device 12 with error counter 15. Message creating device 14 has the same function as message creating device 111 according to the exemplary embodiments above.

Additionally, it is possible for subscriber stations 100, 30 to insert no stuff bits 4621 not only into the first time segment of message 45, 47, but also into the second time segment of message 45, 47, at the points at which stuff bits 4621 are expected given a synchronization of subscriber stations 100, 20, 30 of bus system 2.

Thus, in this way as well the communication in bus system 2 can be accelerated.

According to a fourth exemplary embodiment, one of the subscriber stations 10, 30, 100 sends the remaining 7 bits of identification number 452, identifier extension bit 453, and, if warranted, a further 18 bits of an extended identifier according to the CAN protocol together with the 4-bit data length code according to the CAN protocol with a significantly increased data rate or baud rate in the second time segment, following the arbitration. Given a baud rate that is eight times higher, 30 bits can be shrunk to an overall length of less than 4 bit durations of bits in the arbitration in the first time segment. Only after this are the actual data sent in data phase 454 and checksum field 455, etc., also with an increased baud rate.

All embodiments described above of bus systems 1, 2 of subscriber stations 10, 20, 30, 100 and of the method can be used individually or in all possible combinations. In particular, all features of the above-described exemplary embodiments and/or their modifications can be combined or omitted in any fashion. In addition, in particular the following modifications are conceivable.

Bus system 1, 2 described above according to the exemplary embodiments is described on the basis of a bus system based on the CAN protocol or CAN FD protocol. However, bus system 1, 2 according to the various exemplary embodiments can also be some other kind of communication network. It is advantageous, but not a necessary precondition, that in bus system 1, 2 an exclusive, collision-free access of a subscriber station 10, 20, 30, 100 to bus 40 is ensured at least for particular time spans.

Bus system 1, 2 according to the exemplary embodiments is in particular a CAN network or a CAN FD network or a FlexRay network or an SPI network.

It is possible that one of the two bus leads 41, 42 is connected to ground and is thus a ground lead, and the other of the two bus leads 41, 42 is a signal lead on which the bus signal for messages 45, 46, 47 is transmitted.

The number and configuration of subscriber stations 10, 20, 30, 100 in bus system 1, 2 according to the exemplary embodiments is arbitrary. In particular, only subscriber stations 10 or subscriber stations 30 or subscriber stations 100 may be present in bus systems 1, 2 of the exemplary embodiments.

The functionality of the exemplary embodiments described above does not have to be realized as a communication control device 31. In addition or alternatively, the functionality can be integrated into existing products, such as communication control device 11 or a transceiver device 12. In particular, it is possible for this functionality to be realized as a separate electronic module (chip) or embedded in an integrated overall solution in which only one electronic module (chip) is provided for communication control device 11, transceiver device 12, and for the function of message creating device 111.

What is claimed is:

1. A subscriber station for a serial bus system, comprising:
   a message creating device configured to create messages, to be transmitted serially via a bus of the bus system for receipt at at least one further subscriber station of the bus system, according to a first protocol so that each of the messages created according to the first protocol has a first time segment and a second time segment, wherein the creation of the messages includes insertion of respective identification numbers into the respective first time segments of the messages, and the respective second time segments begin after at least respective final bits of the respective identification numbers;
   a transceiver device configured to serially send the messages to the bus in such a way that data in the first time segments are sent with a slower data rate than in the second time segments, the transceiver device, in the second time segments, having at least at times an exclusive, collision-free access to the bus, wherein respective error messages are receivable by the subscriber station at least when the at least one further subscriber station receives one or more of the messages sent by the transceiver device such that, upon the receipt of the respective message, the respective message includes more than a predefined number of consecutive dominant bits; and
   a counter configured to maintain a count that tracks a number of the error messages received from the at least one further subscriber station in response to the sending of the messages;
   wherein:
      the subscriber station is configured to switch to use of a second protocol to create a message in response to the number of the error messages tracked by the count reaching a predefined value;
      one of the plurality of identification numbers the subscriber station is configured to insert into respective ones of the messages is such that insertion of the respective identification number into the respective messages causes the respective message to include more than the predefined number of consecutive dominant bits; and
      the subscriber station is configured for the count of the counter not to be incremented in response to an error message that is due to the inclusion of the more than the predefined number of consecutive dominant bits in a respective one of the messages when the respective identification number of the respective message causes the respective message to include the more than the predefined number of consecutive dominant bits.

2. The subscriber station as recited in claim 1, wherein the one of the plurality of identification numbers that, when inserted, causes the inclusion of the more than the predefined number of consecutive dominant bit has the value 0, the subscriber station being configured to insert the one of the plurality of identification numbers without insertion of stuff bits.

3. The subscriber station as recited in claim 1, wherein:
   the first time segment ends at the point at which a stuff bit is expected by one of the subscriber stations given a synchronization of the subscriber stations of the bus system, if one of the other subscriber stations transmits a message having an identification number having the value 0; and/or
   the transceiver device is configured to send and to receive the first four bits of the identification number with a slower data rate than the subsequent bits of the respective message.

4. The subscriber station as recited in claim 1, wherein the message creating device is configured to first provide a reserved bit directly following bits of the identification number, and then to provide a data phase for useful data to be transmitted.

5. The subscriber station as recited in claim 4, wherein the reserved bit is a first bit of the second time segment.

6. The subscriber station as recited in claim 1, wherein the message creating device is configured to terminate the respective messages with an acknowledge field terminating bit.

7. The subscriber station as recited in claim 1, wherein the transceiver device is configured to select, after reception of an error message from at least one further subscriber station of the bus system in the first time segment or at a beginning of the second time segment, whether the sending of the message is to be continued or whether instead a message is to be created that corresponds to the CAN protocol.

8. The subscriber station as recited in claim 1, wherein:
the error counter is configured to count how often a transmit attempt is aborted; and
the subscriber station is configured to change over to a transmit operation in which a message corresponding to the CAN protocol is sent when a counter state of the counter reaches the predefined value.

9. The subscriber station as recited in claim 1, wherein the transceiver device is configured to insert no stuff bits into the first time segment and/or the second time segment of the message at points at which the stuff bits are expected given a synchronization of the subscriber stations of the bus system.

10. The subscriber station as recited in claim 1, wherein the subscriber station has an exclusive, collision-free access to the bus in the second time segment at least for sending of useful data of the respective messages.

11. The subscriber station as recited in claim 1, wherein the first time segment is a time segment in which it is determined which subscriber station after the first time segment will receive at least at times an exclusive, collision-free access to the bus.

12. A bus system, comprising:
a bus;
a first subscriber station; and
at least one further subscriber station, the first subscriber station and the at least one further subscriber station being connected to one another via the bus in such a way that they can communicate with each other, the first subscriber station including:
a message creating device configured to create messages, to be transmitted serially via a bus of the bus system for receipt at the at least one further subscriber station of the bus system, according to a first protocol so that each of the messages created according to the first protocol has a first time segment and a second time segment, wherein the creation of the messages includes insertion of respective identification numbers into the respective first time segments of the messages, and the respective second time segments begin after at least respective final bits of the respective identification numbers;
a transceiver device configured to serially send the messages to the bus in such a way that data in the first time segments are sent with a slower data rate than in the second time segments, the transceiver device, in the second time segments, having at least at times an exclusive, collision-free access to the bus, wherein respective error messages are receivable by the first subscriber station at least when the at least one further subscriber station receives one or more of the messages sent by the transceiver device such that, upon the receipt of the respective message, the respective message includes more than a predefined number of consecutive dominant bits; and
a counter configured to maintain a count that tracks a number of the error messages received from the at least one further subscriber station in response to the sending of the messages;
wherein:
the first subscriber station is configured to switch to use of a second protocol to create a message in response to the number of the error messages tracked by the count reaching a predefined value;
one of the plurality of identification numbers the first subscriber station is configured to insert into respective ones of the messages is such that insertion of the respective identification number into the respective messages causes the respective message to include more than the predefined number of consecutive dominant bits; and
the first subscriber station is configured for the count of the counter not to be incremented in response to an error message that is due to the inclusion of the more than the predefined number of consecutive dominant bits in a respective one of the messages when the respective identification number of the respective message causes the respective message to include the more than the predefined number of consecutive dominant bits.

13. The bus system as recited in claim 12, wherein the first subscriber station and the at least one further subscriber station are configured to maintain no wait time between messages that are transmitted one after the other via the bus.

14. A method for data transmission in a serial bus system, the method being carried out by a subscriber station of the bus system, the method comprising:
creating, with a message creating device of the subscriber station, messages, to be transmitted serially via a bus of the bus system for receipt at at least one additional subscriber station of the bus system, according to a first protocol so that each of the messages created according to the first protocol has a first time segment and a second time segment, wherein the creation of the messages includes insertion of respective identification numbers into the respective first time segments of the messages, and the respective second time segments begin after at least respective final bits of the respective identification numbers;
a transceiver device of the subscriber station sending the messages to the bus serially in such a way that data in the first time segments are sent with a slower data rate than in the second time segments, the transceiver device having, in the second time segments, at least at times an exclusive, collision-free access to the bus, wherein respective error messages are receivable by the subscriber station at least when the at least one additional subscriber station receives one or more of the messages sent by the transceiver device such that, upon the receipt of the respective message, the respective message includes more than a predefined number of consecutive dominant bits; and
a counter of the subscriber station maintaining a count that tracks a number of the error messages received from the at least one additional subscriber station in response to the sending of the messages;
wherein:
the subscriber station is configured to switch to use of a second protocol to create a message in response to the number of the error messages tracked by the count reaching a predefined value;
one of the plurality of identification numbers the subscriber station is configured to insert into respective ones of the messages is such that insertion of the respective identification number into the respective messages causes the respective message to include more than the predefined number of consecutive dominant bits; and
the subscriber station is configured for the count of the counter not to be incremented in response to an error message that is due to the inclusion of the more than the predefined number of consecutive dominant bits in a respective one of the messages when the respective identification number of the respective message causes the respective message to include the more than the predefined number of consecutive dominant bits.

* * * * *